(12) United States Patent
Yamamoto et al.

(10) Patent No.: US 10,802,873 B2
(45) Date of Patent: Oct. 13, 2020

(54) COMPUTER SYSTEM AND PROGRAM MIGRATION METHOD

(71) Applicant: Hitachi, Ltd., Tokyo (JP)

(72) Inventors: Sho Yamamoto, Tokyo (JP); Shingo Maeda, Tokyo (JP); Yuki Koizumi, Tokyo (JP)

(73) Assignee: HITACHI, LTD., Tokyo (JP)

(*) Notice: Subject to any disclaimer, the term of this patent is extended or adjusted under 35 U.S.C. 154(b) by 147 days.

(21) Appl. No.: 16/117,306

(22) Filed: Aug. 30, 2018

(65) Prior Publication Data

US 2019/0188036 A1 Jun. 20, 2019

(30) Foreign Application Priority Data

Dec. 15, 2017 (JP) ................. 2017-240573

(51) Int. Cl.
*G06F 9/46* (2006.01)
*G06F 9/48* (2006.01)
*G06F 8/76* (2018.01)

(52) U.S. Cl.
CPC .............. *G06F 9/4881* (2013.01); *G06F 8/76* (2013.01); *G06F 9/4856* (2013.01)

(58) Field of Classification Search
CPC ......... G06F 9/4881; G06F 8/76; G06F 9/4856
See application file for complete search history.

(56) References Cited

U.S. PATENT DOCUMENTS

| 2007/0256058 A1* | 11/2007 | Marfatia | G06F 8/51 717/137 |
| 2012/0185848 A1* | 7/2012 | Devarakonda | G06F 9/5077 718/1 |
| 2017/0286187 A1* | 10/2017 | Chen | G06F 9/50 |

FOREIGN PATENT DOCUMENTS

WO 2017/072978 A1 5/2017

* cited by examiner

*Primary Examiner* — Camquy Truong
(74) *Attorney, Agent, or Firm* — Mattingly & Malur, PC

(57) ABSTRACT

Provided are a computer system and a program migration method capable of properly migrating programs between different computers. A first computer calculates a migration priority of each of the plurality of programs based on information which indicates weighting relative to usage of hardware resources, and operation information of hardware resources in the first computer when each of the plurality of programs is executed, and, based on hardware resource expansion schedule information which defines hardware resources of the second computer in each of a plurality of migration phases, determines migration feasibility of a program in hardware resources used in each migration phase and decides the migration phase for migrating each of the plurality of programs in order from a first migration phase of the plurality of migration phases and in order of the calculated migration priority.

7 Claims, 23 Drawing Sheets

FIG.3

| JOB NAME | JOB STEP NAME | PROGRAM NAME | EXECUTION START DATE/TIME | EXECUTION TIME | CPU OPERATING TIME | MEMORY USAGE | DISK USAGE |
|---|---|---|---|---|---|---|---|
| JOB1 | STEP1 | AAA | 2017/3/23 18:36:30 | 3200ms | 2200ms | 3088KB | 100MB |
| JOB1 | STEP2 | BBB | 2017/3/23 18:36:34 | 2100ms | 1100ms | 100KB | 10MB |
| JOB1 | STEP3 | CCC | 2017/3/23 18:36:36 | 1500ms | 1500ms | 160KB | 50MB |
| JOB2 | STEP1 | BBB | 2017/3/23 18:36:38 | 1000ms | 100ms | 20KB | 5MB |
| JOB1 | STEP1 | AAA | 2017/3/24 18:36:30 | 3100ms | 1800ms | 3088KB | 100MB |
| JOB1 | STEP2 | BBB | 2017/3/24 18:36:34 | 1900ms | 900ms | 300KB | 10MB |
| JOB1 | STEP3 | CCC | 2017/3/24 18:36:36 | 1500ms | 1500ms | 160KB | 50MB |
| JOBN | STEPM | BBB | YYYY/MM/DD hh:mm:ss | 100ms | 100ms | 20KB | 5MB |

| JOB NAME | JOB STEP NAME | PROGRAM NAME | JOB STEP-BASED MIGRATION PRIORITY | EXECUTION COUNT | AVERAGE CPU OPERATING TIME | AVERAGE MEMORY USAGE | AVERAGE DISK USAGE | NUMBER OF DISKS USED | EXECUTION FREQUENCY | AVERAGE EXECUTION TIME |
|---|---|---|---|---|---|---|---|---|---|---|
| JOB1 | STEP1 | AAA | 150.0 | 30 | 2000ms | 3088KB | 111MB | 1 DISK | 30 EXECUTIONS/MONTH | 3000ms |
| JOB1 | STEP2 | BBB | 70.0 | 30 | 1000ms | 200KB | 10MB | 2 DISKS | 30 EXECUTIONS/MONTH | 2000ms |
| JOB1 | STEP3 | CCC | 17.5 | 5 | 1500ms | 160KB | 50MB | 1 DISK | 5 EXECUTIONS/MONTH | 1800ms |
| ... | | | | | | | | | | |
| JOBN | STEPM | BBB | 0.2 | 1 | 100ms | 20KB | 5MB | 1 DISK | 1 EXECUTION/MONTH | 100ms |

| MIGRATION POLICY PARAMETER NAME | CPU OPERATING TIME PRIORITY RELATIVE RATIO | MEMORY USAGE PRIORITY RELATIVE RATIO | DISK USAGE PRIORITY RELATIVE RATIO | NUMBER OF DISKS USED PRIORITY RELATIVE RATIO | BATCH PROCESSING PERMISSIBLE EXTENSION TIME |
|---|---|---|---|---|---|
| PARAMETER 1 | 80 | 10 | 10 | 0 | 1h |
| PARAMETER 2 | 60 | 30 | 10 | 0 | 1h |
| PARAMETER n | 20 | 40 | 40 | 0 | 2h |

| MODEL | CPU OPERATING TIME CALCULATION STANDARD COEFFICIENT | MEMORY USAGE CALCULATION STANDARD COEFFICIENT | DISK USAGE CALCULATION STANDARD COEFFICIENT | NUMBER OF DISKS USED CALCULATION STANDARD COEFFICIENT |
|---|---|---|---|---|
| A | 2.78 | 2.80 | 18.0 | 100.0 |
| B | 60 | 2.35 | 18.0 | 100.0 |
| ... | | | | |
| N | 20 | 2.35 | 18.0 | 100.0 |

| PROGRAM NAME | PROGRAM-BASED MIGRATION PRIORITY |
|---|---|
| AAA | 150.0 |
| BBB | 70.2 |
| CCC | 17.5 |
| ︙ | ︙ |
| nnn | 0.1 |

| MIGRATION PHASE | PROGRAM NAME | PORTED FLAG (*1) | MIGRATED FLAG | SUCCESS COUNT | MIGRATION FAILURE CODE (*2) |
|---|---|---|---|---|---|
| PHASE 1 | AAA | 1 | 1 | 5 | 0 |
| PHASE 1 | BBB | 1 | 0 | 0 | 2 |
| PHASE n | nnn | 0 | 0 | 0 | 0 |

157

(*1) FLAG INDICATING THAT PROGRAM HAS BEEN MODIFIED AND PORTED TO SECOND COMPUTER (*2) 0: NOT MIGRATION FAILURE; 1: EXECUTION RESULT ERROR; 2: EXECUTION DELAY

FIG.9

| MIGRATION PHASE | MIGRATION IN PROGRESS FLAG | MIGRATION PHASE COMPLETION FLAG |
|---|---|---|
| PHASE 1 | 0 | 1 |
| PHASE 2 | 1 | 0 |
| PHASE n | 0 | 0 |

| MIGRATION PHASE | CPU PERFORMANCE | CPU CORE COUNT | MEMORY CAPACITY | DISK CAPACITY |
|---|---|---|---|---|
| PHASE 1 | 30MIPS | 1 | 1GB | 1TB |
| PHASE 2 | 30MIPS | 1 | 16GB | 1TB |
| ⋮ | | ⋮ | | |
| PHASE n | 30MIPS | 4 | 16GB | 1TB |

<WHEN ALL PROGRAMS ARE MIGRATABLE> 301

| MIGRATION PHASE | NAME OF PROGRAM TO BE MIGRATED | MIGRATION PRIORITY |
|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 |

FIG.19

<WHEN THERE IS A PROGRAM THAT IS NOT MIGRATABLE> 302

| MIGRATION PHASE | NAME OF PROGRAM TO BE MIGRATED | MIGRATION PRIORITY |
|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 |
| MIGRATION NOT POSSIBLE | FFF | 2.0 |

FIG.20

<UPON COMPLETION OF ONE MIGRATION PHASE>

303

| MIGRATION PHASE | NAME OF PROGRAM TO BE MIGRATED | MIGRATION PRIORITY | CONSECUTIVE SUCCESS COUNT | PROGRAM MIGRATION INFORMATION |
|---|---|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 | 5<br>5<br>5<br>5 | SUCCESSFUL<br>SUCCESSFUL<br>SUCCESSFUL<br>SUCCESSFUL |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 | 0 | INCOMPLETE |

FIG.21

\<UPON COMPLETION OF ALL MIGRATION PHASES\>

304

| MIGRATION PHASE | NAME OF PROGRAM TO BE MIGRATED | MIGRATION PRIORITY | CONSECUTIVE SUCCESS COUNT | PROGRAM MIGRATION INFORMATION |
|---|---|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 | 5<br>5<br>5<br>5 | SUCCESSFUL<br>SUCCESSFUL<br>SUCCESSFUL<br>SUCCESSFUL |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 | 5 | SUCCESSFUL |

FIG.22

<UPON MIGRATION FAILURE (EXECUTION RESULT ERROR)> ~305

| MIGRATION PHASE | NAME OF PROGRAM TO BE MIGRATED | MIGRATION PRIORITY | CONSECUTIVE SUCCESS COUNT | PROGRAM MIGRATION INFORMATION |
|---|---|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 | 5<br>5<br>5<br>0 | SUCCESSFUL<br>SUCCESSFUL<br>SUCCESSFUL<br>FAILURE (RESULT ERROR) |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 | 0 | INCOMPLETE |

FIG.23

<UPON MIGRATION FAILURE (EXECUTION DELAY)>

306

| MIGRATION PHASE | NAME OF PROGRAM TO BE MIGRATED | MIGRATION PRIORITY | CONSECUTIVE SUCCESS COUNT | PROGRAM MIGRATION INFORMATION |
|---|---|---|---|---|
| PHASE 1<br>CPU PERFORMANCE: 30 MIPS<br>CPU CORE COUNT: 1<br>MEMORY CAPACITY: 1 GB<br>DISK CAPACITY: 1 TB | AAA<br>BBB<br>DDD<br>EEE | 150.0<br>72.3<br>10.5<br>2.5 | 5<br>5<br>5<br>0 | SUCCESSFUL<br>SUCCESSFUL<br>SUCCESSFUL<br>FAILURE (EXECUTION DELAY) |
| PHASE 2<br>CPU PERFORMANCE: 30 MIPS<br>CPU CORE COUNT: 2<br>MEMORY CAPACITY: 1 GB<br>DISK CAPACITY: 1 TB | CCC | 17.5 | 0 | INCOMPLETE |

COMPUTER SYSTEM AND PROGRAM MIGRATION METHOD

CROSS-REFERENCE TO RELATED APPLICATION

The present application claims priority from Japanese application JP 2017-240573, filed on Dec. 15, 2017, the contents of which is hereby incorporated by reference into this application.

TECHNICAL FIELD

The present invention relates to a computer system and a program migration method, and, for example, can be suitably applied to the migration of programs from a first computer to a second computer.

BACKGROUND ART

The migration of operations from a mainframe system to an open system is carried out by modifying, and subsequently migrating, all programs for executing business processing into a format that is compatible with the open system, and thereafter once stopping the operations on the mainframe system side, and then resuming the operations on the open system side.

With the foregoing method, because it is necessary to estimate the hardware resources required in the open system as the migration destination, modify several thousand to several ten thousand programs, and verify the modified programs, it takes several months to several years to complete all preparations, and there is a problem in that the programs cannot be migrated swiftly.

Moreover, upon estimating the required hardware resources, because the estimation must have a certain level of margin in order to prevent the occurrence of malfunctions caused by insufficient resources, there is also a problem in that excess costs will be required by that much as the initial costs for introducing an open system.

In addition, because it is necessary to once stop the operations on the mainframe system side as described above, there is a problem in that the business processing cannot be executed during that period.

As means for resolving the foregoing problems, disclosed is a method of automatically migrating job steps in program units (refer to PTL 1). With this method, the programs required for operating the job steps, which need to be executed on the open system side, are caused to be executable on the open system side in advance, and control is performed so that the mainframe system can automatically operate only those corresponding programs on the open system side. It is thereby possible to migrate programs in order, from those in which the modification thereof is complete, to the open system without having to stop the system. Once the migration of all programs is complete and all job steps are operable in the open system, the migration is thereby complete. Moreover, because it will be sufficient for the open system side to have hardware resources required for executing the migrated programs, it is possible to suppress the initial cost for installing the hardware of the open system.

CITATION LIST

Patent Literature

[PTL 1] International Publication No. 2017/072978

SUMMARY OF THE INVENTION

Problems to be Solved by the Invention

Generally speaking, the hardware resources of a mainframe system are more expensive than the hardware resources of an open system. However, because no consideration is given to this point by the technology described in PTL 1, there is a problem in that, depending on the migration order of programs, it may not be possible to reduce the hardware resources of the mainframe system until the final stage of the migration, which will result in increased running costs. Moreover, if there is any shortage in the hardware resources of the open system, there is a problem in that this may result in the overrun of processing (situation where the processing is not completed by the scheduled end time).

The present invention was devised in view of the foregoing points, and an object of this invention is to provide a computer system and a program migration method capable of properly migrating programs between different computers.

Means to Solve the Problems

In order to achieve the foregoing object, the present invention provides a computer system comprising a first computer as a migration source of a plurality of programs, and a second computer as a migration destination of the plurality of programs and which is different from the first computer, wherein the first computer: calculates a migration priority of each of the plurality of programs based on information which indicates weighting relative to usage of hardware resources, and operation information of hardware resources in the first computer when each of the plurality of programs is executed; and based on hardware resource expansion schedule information which defines hardware resources of the second computer in each of a plurality of migration phases, determines migration feasibility of a program in hardware resources used in each migration phase and decides the migration phase for migrating each of the plurality of programs in order from a first migration phase of the plurality of migration phases and in order of the calculated migration priority.

The present invention additionally provides a program migration method in a computer system comprising a first computer as a migration source of a plurality of programs, and a second computer as a migration destination of the plurality of programs and which is different from the first computer, wherein the program migration method comprises: a first step of a computer calculating a migration priority of each of the plurality of programs based on information which indicates weighting relative to usage of hardware resources, and operation information of hardware resources in the first computer when each of the plurality of programs is executed; and a second step of a computer, based on hardware resource expansion schedule information which defines hardware resources of the second computer in each of a plurality of migration phases, determining migration feasibility of a program in hardware resources used in each migration phase and deciding the migration phase for migrating each of the plurality of programs in order from a first migration phase of the plurality of migration phases and in order of the calculated migration priority.

According to the foregoing configuration, it is possible to determine the migration phase of migrating each of the plurality of programs.

Advantageous Effects of the Invention

According to the present invention, it is possible to properly migrate programs between different computers.

BRIEF DESCRIPTION OF DRAWINGS

FIG. 3 is a diagram showing an example of the job step operation information table according to the first embodiment.

FIG. 4 is a diagram showing an example of the job step operation information tabulation table according to the first embodiment.

FIG. 5 is a diagram showing an example of the migration policy table according to the first embodiment.

FIG. 6 is a diagram showing an example of the calculation standard coefficient table according to the first embodiment.

FIG. 7 is a diagram showing an example of the migration priority table according to the first embodiment.

FIG. 8 is a diagram showing an example of the migration program management table according to the first embodiment.

FIG. 9 is a diagram showing an example of the migration phase management table according to the first embodiment.

FIG. 10 is a diagram showing an example of the hardware resource expansion schedule table according to the first embodiment.

FIG. 18 is a diagram showing an example of the output of the migration schedule according to the first embodiment.

FIG. 19 is a diagram showing an example of the output of the migration schedule according to the first embodiment.

FIG. 20 is a diagram showing an example of the output of the migration report according to the first embodiment.

FIG. 21 is a diagram showing an example of the output of the migration report according to the first embodiment.

FIG. 22 is a diagram showing an example of the output of the migration report according to the first embodiment.

FIG. 23 is a diagram showing an example of the output of the migration report according to the first embodiment.

DESCRIPTION OF EMBODIMENTS

An embodiment of the present invention is now explained in detail with reference to the appended drawings.

(1) Configuration of Computer System According to this Embodiment

Figure 1:
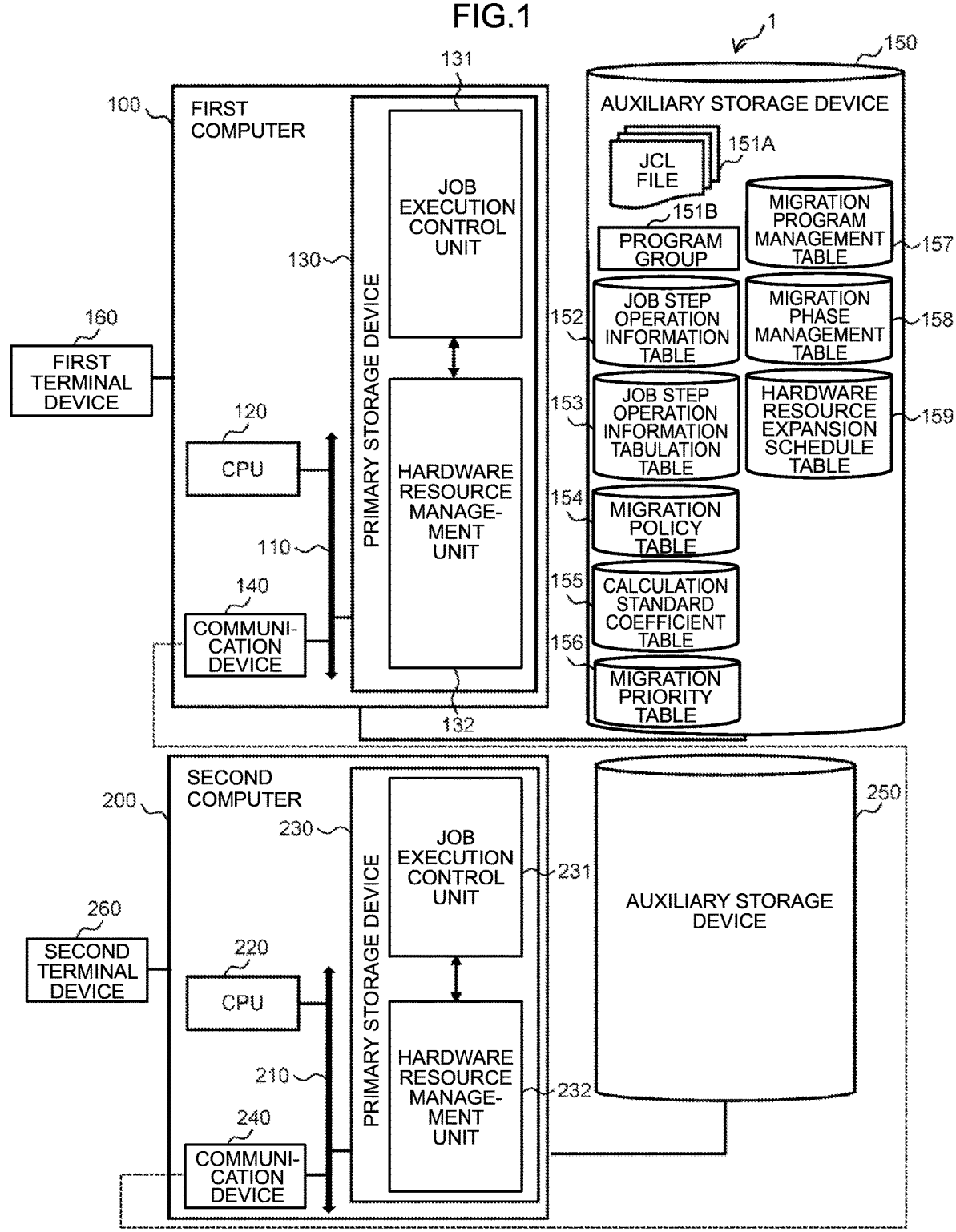
FIG. 1 is a diagram showing an example of the configuration of the computer system according to the first embodiment.

In FIG. 1, reference numeral 1 represents the overall computer system according to the first embodiment. The computer system 1 is configured by including a first computer 100 as a migration source of programs and a second computer 200 as a migration destination of those programs. The first computer 100 and the second computer 200 are mutually different computers, and communicably connected. In the computer system 1, for example, a migratable program that uses much hardware resources among a plurality of programs pertaining to the operation (for example, batch processing) to be executed in the first computer 100 is foremost migrated to the second computer 200. This is explained in detail below.

The first computer 100 is a computer such as a server apparatus or a mainframe system which executes various types of pre-set business processing, and is configured by comprising information processing resources such as a CPU (Central Processing Unit) 120, a primary storage device 130, and a communication device 140 which are connected via an internal bus 110.

The CPU 120 is a processor that governs the operational control of the overall first computer 100. The primary storage device 130 is configured, for example, from a semiconductor memory or the like, and, in addition to be used for storing various programs, it is also used as a work memory of the CPU 120. For example, as a result of the CPU 120 reading programs stored in an auxiliary storage device 150 or a ROM (Read Only Memory; not shown) into the primary storage device 130 and executing such programs, program modules (job execution control unit 131, hardware resource management unit 132, and the like) are thereby realized.

Note that, while details will be described later, the job execution control unit 131 controls jobs in the batch processing, creates migration schedules, and manages the migration of programs. The hardware resource management unit 132 manages the hardware resources (for example, CPU 120, primary storage device 130 (memory), auxiliary storage device 150 (disk)) of the first computer 100. For example, the hardware resource management unit 132 collects (acquires) information regarding hardware resources (first hardware resource information), and sends (notifies) the first hardware resource information to the job execution control unit 131. The first hardware resource information is information which indicates the specification (for example, CPU performance, CPU core count, memory capacity, disk capacity) of the hardware resources of the first computer 100.

The communication device 140 is configured, for example, from an NIC (Network Interface Card), and performs protocol control during communication with the second computer 200.

Moreover, an auxiliary storage device 150 and a first terminal device 160 are also connected to the first computer 100.

The auxiliary storage device 150 is configured from a large-capacity non-volatile storage device such as a hard disk device or an SSD (Solid State Drive). The auxiliary storage device 150 stores, for instance, a JCL file 151A (FIG. 2) in which the contents of batch processing are described in JCL (Job Control Language), a program group 151B (FIG. 2) including various programs, a job step operation information table 152 (FIG. 3), a job step operation information tabulation table 153 (FIG. 4), a migration policy table 154 (FIG. 5), a calculation standard coefficient table 155 (FIG. 6), a migration priority table 156 (FIG. 7), a migration program management table 157 (FIG. 8), a migration phase management table 158 (FIG. 9), and a hardware resource expansion schedule table 159 (FIG. 10).

The first terminal device 160 is able to receive various types of information, and is a laptop PC or a smartphone that is used by a user (administrator or the like) for creating migration schedules and confirming the migration status of programs. For example, the user can use the first terminal device 160 to perform various settings in the first computer 100 and display various types of information regarding the first computer 100 on the first terminal device 160.

The second computer 200 is a computer such as a server apparatus or an open system which executes various types of pre-set business processing, and is configured by comprising information processing resources such as a CPU 220, a primary storage device 230, and a communication device 240 which are connected via an internal bus 210. Moreover, an auxiliary storage device 250 and a second terminal device 260 are also connected to the second computer 200. Because the CPU 220, the primary storage device 230, the communication device 240, the auxiliary storage device 250, and the second terminal device 260 are configured in the same manner as their counterparts of the first computer 100, the explanation thereof is omitted.

Figure 2:
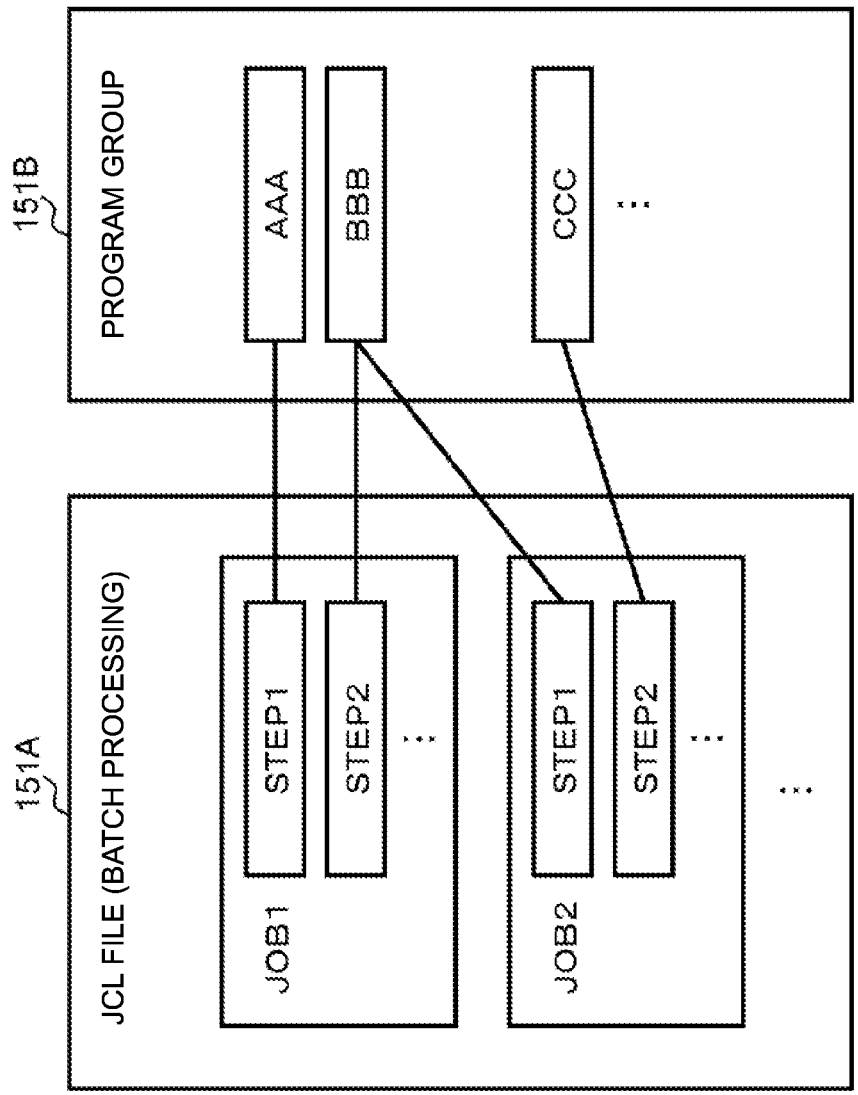
FIG. 2 is a diagram showing an example of the JCL file according to the first embodiment.

(2) Various Types of Data (File, Table and the Like) Used by the First Computer (2-1) JCL File FIG. 2 is a diagram showing an example of the JCL file 151A. The JCL file 151A stores information regarding programs to be executed and disks to be accessed for designating batch processing and timing of activating resident processes to the job execution control unit 131.

Here, batch processing is configured from a plurality of jobs (JOB 1, JOB 2, . . . ) with a prescribed execution order as shown in FIG. 2, and each job is configured from one or more job steps (STEP 1, STEP 2, . . . ) each prescribed with an execution order. A "job" is a processing unit in batch processing, and a "job step" is a processing unit in a job.

One job step is completed by one program associated with that job step being executed. One job is completed by each program associated with each job step being sequentially executed in the order of the job steps. One batch processing is ended when all jobs are completed. Note that, as shown in FIG. 2, there are cases where one job step is associated with a program, and cases where a plurality of job steps are associated with a program.

(2-2) Job Step Operation Information Table

FIG. 3 is a diagram showing an example of the job step operation information table 152. The job step operation information table 152 stores information (job step operation information) which indicates the usage of hardware resources that were used by the job execution control unit 131 to execute the job step, and is recorded at the time that the execution is completed. For example, the job step operation information table 152 associates and stores information such as job name, job step name, program name, execution start date/time, execution time, CPU operating time, memory usage, and disk usage.

The job name stores identifying information capable of identifying the job. The job step name stores identifying information capable of identifying the job step. The program name stores identifying information capable of identifying the program associated with the job step. The execution start date/time stores information indicating the date/time that the execution of the job step was started. The execution time stores information indicating the time that was required for executing the job step.

The CPU operating time stores information indicating the time that the CPU 120 was used for executing the job step. The memory usage stores information indicating the capacity of the primary storage device 130 that was used for executing the job step. The disk usage stores information indicating the capacity of the auxiliary storage device 150 that was used for executing the job step.

(2-3) Job Step Operation Information Tabulation Table

FIG. 4 is a diagram showing an example of the job step operation information tabulation table 153. The job step operation information tabulation table 153 stores the result of tabulation of the job step operation information performed by the job execution control unit 131. For example, the job step operation information tabulation table 153 associates and stores information such as job name, job step name, program name, job step-based migration priority, execution count, average CPU operating time, average memory usage, average disk usage, number of disks used, execution frequency, and average execution time.

The job name stores identifying information capable of identifying the job. The job step name stores identifying information capable of identifying the job step. The program name stores identifying information capable of identifying the program associated with the job step. The job step-based migration priority stores information indicating the migration priority of the job step. Note that the calculation method of migration priority will be described later.

The execution count stores information indicating the number of times that the job step was executed during the tabulation period (for example, 1 month). The average CPU operating time stores information indicating the average value of the time that the CPU 120 was used for executing the job step during the tabulation period. The average memory usage stores information indicating the average value of the capacity of the primary storage device 130 that was used for executing the job step during the tabulation period. The average disk usage stores information indicating the average value of the capacity of the auxiliary storage device 150 that was used for executing the job step during the tabulation period. The number of disks used stores information indicating the number of disks that were used for executing the job step. The execution frequency stores information indicating the frequency that the job step is executed within a predetermined period. The average execution time stores information indicating the average value of the time that was required for executing the job step during the tabulation period.

(2-4) Migration Policy Table

FIG. 5 is a diagram showing an example of the migration policy table 154. The migration policy table 154 stores information (weighting of migration priority) indicating which item should be emphasized in creating the migration schedule among the usage of hardware resources input by the user, and permissible extension time of the execution time of batch processing (batch processing permissible extension time). For example, the migration policy table 154 associates and stores information such as migration policy parameter name, CPU operating time priority relative ratio, memory usage priority relative ratio, disk usage priority relative ratio, number of disks used priority relative ratio, and batch processing permissible extension time.

For example, when the user uses the first terminal device 160 and inputs the weighting of the CPU operating time, the memory usage, the disk usage, and the number of disks used in terms of relative ratio, the input values are stored in the migration policy table 154. Note that the user inputs "0" for any item that may be disregarded. Moreover, for example, when the user uses the first terminal device 160 and inputs the batch processing permissible extension time, the input value is stored in the migration policy table 154.

(2-5) Calculation Standard Coefficient Table

FIG. 6 is a diagram showing an example of the calculation standard coefficient table 155. The calculation standard coefficient table 155 stores information of coefficients (calculation standard coefficients) for arranging the usage unit of hardware resources. For example, the calculation standard coefficient table 155 associates and stores information such as model (of the first computer 100), CPU operating time calculation standard coefficient, memory usage calculation standard coefficient, disk usage calculation standard coefficient, and number of disks used calculation standard coefficient. Note that the calculation standard coefficients (numerical values) are determined, for example, according to the hardware architecture.

(2-6) Migration Priority Table

FIG. 7 is a diagram showing an example of the migration priority table 156. The migration priority table 156 stores information indicating the priority (migration priority of programs) when the job execution control unit 131 is to migrate programs. For example, the migration priority table 156 associates and stores information such as program name, and program-based migration priority. The program-based migration priority is the total value of migration priority of job steps of the same program name.

(2-7) Migration Program Management Table

FIG. 8 is a diagram showing an example of the migration program management table 157. The migration program management table 157 stores information for the job execution control unit 131 to manage the migration status of programs. For example, the migration program management table 157 associates and stores information such as migration phase, program name, ported flag, migrated flag, success count, and migration failure code.

The migration phase stores identifying information capable of identifying the migration phase. The program name stores information capable of identifying the program. The ported flag stores information indicating whether a program that is operable in the second computer 200 has been modified (upgraded) and ported to the second computer 200. Note that a program that has been modified to be operable in the second computer 200 and ported to the second computer 200 is hereinafter referred to as a "ported program" as appropriate. The migrated flag stores information indicating whether the normal operation of the ported program in the second computer 200 has been confirmed and the migration of the program has been completed. Note that, once the migration of the program is completed, the execution of that program is succeeded by the second computer 200, and the first computer 100 will no longer execute that program.

The success count stores information indicating the number of times that the ported program operated normally in the second computer 200. The migration failure code stores information pertaining to the failure in the migration of the program. For example, migration failure code "0" indicates that there is no failure in the execution of the ported program in the second computer 200, migration failure code "1" indicates that there was an error in the result of executing the ported program in the second computer 200, and migration failure code "2" indicates that there was a delay in the execution of the ported program in the second computer 200.

(2-8) Migration Phase Management Table

FIG. 9 is a diagram showing an example of the migration phase management table 158. The migration phase management table 158 stores information for the job execution control unit 131 to manage the migration phase. For example, the migration phase management table 158 associates and stores information such as migration phase, migration in progress flag, and migration phase completion flag.

The migration phase stores identifying information capable of identifying the migration phase. The migration in progress flag stores information indicating whether it is a migration phase in which migration is in progress. The migration phase completion flag stores information indicating whether it is a migration phase in which migration has been completed.

(2-9) Hardware Resource Expansion Schedule Table

FIG. 10 is a diagram showing an example of the hardware resource expansion schedule table 159. The hardware resource expansion schedule table 159 stores information of the expansion schedule of hardware resources input by the user (hardware resource expansion schedule information). For example, the hardware resource expansion schedule table 159 associates and stores information such as migration phase, CPU performance, CPU core count, memory capacity, and disk capacity.

The migration phase stores identifying information capable of identifying the migration phase. The CPU performance stores information indicating the number of commands that the CPU 220, which is to be used in that migration phase, can execute in 1 second. The CPU core count stores information indicating the number of cores of the CPU 220 to be used in that migration phase. The memory capacity stores information indicating the capacity of the primary storage device 230 to be used in that migration phase. The disk capacity stores information indicating the capacity of the auxiliary storage device 250 to be used in that migration phase.

For example, in the migration phase of "phase 1", used as the hardware resources are a CPU 220 having a CPU performance of "30 MIPS" and a CPU core count of "1", a primary storage device 230 having a memory capacity of "1 GB", and an auxiliary storage device 250 having a disk capacity of "1 TB".

(3) Various Types of Processing Related to Migration of Programs in Batch Processing The specific processing contents (program migration method) of various types of processing according to this embodiment are now explained. Note that, in the ensuing explanation, while a "program module" is explained as the processing agent of the various types of processing, it goes without saying that, in effect, the CPU 120 of the first computer 100 or the CPU 220 of the second computer 200 executes the processing based on the program module.

Figure 11:
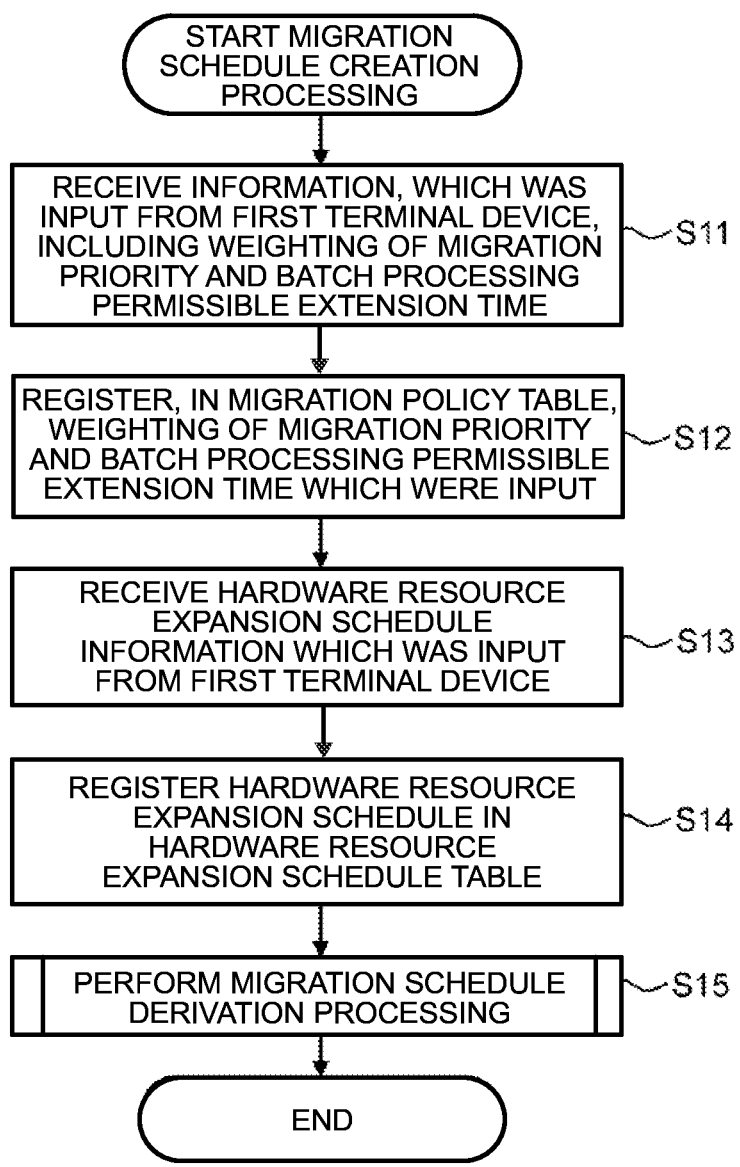
FIG. 11 is a diagram showing an example of the processing routine of the migration schedule creation processing according to the first embodiment.

(A) Various Types of Processing Related to Migration Schedule of Programs in Batch Processing (A-1) Migration Schedule Creation Processing FIG. 11 is a diagram showing an example of the processing routine of the migration schedule creation processing to be executed by the job execution control unit 131 of the first computer 100 at the time that the first terminal device 160 receives an instruction from the user for creating a migration schedule.

Foremost, the job execution control unit 131 receives, from the first terminal device 160, information of the weighting of migration priority (CPU operating time priority relative ratio, memory usage priority relative ratio, disk usage priority relative ratio, and number of disks used priority relative ratio) and the batch processing permissible extension time input with the first terminal device 160 (step S11).

Next, the job execution control unit 131 stores (registers) the input information of the weighting of migration priority and the batch processing permissible extension time in the migration policy table 154 (step S12).

Next, the job execution control unit 131 receives, from the first terminal device 160, the hardware resource expansion schedule information input with the first terminal device 160 (step S13).

Next, the job execution control unit 131 stores (registers) the input hardware resource expansion schedule information in the hardware resource expansion schedule table 159 (step S14).

Next, the job execution control unit 131 performs migration schedule derivation processing (step S15), and then ends the migration schedule creation processing. Note that, while the details will be described later, in the migration schedule derivation processing, a migration schedule which prescribes the migration phase of each program is derived (created).

(A-2) Migration Schedule Derivation Processing

Figure 12:
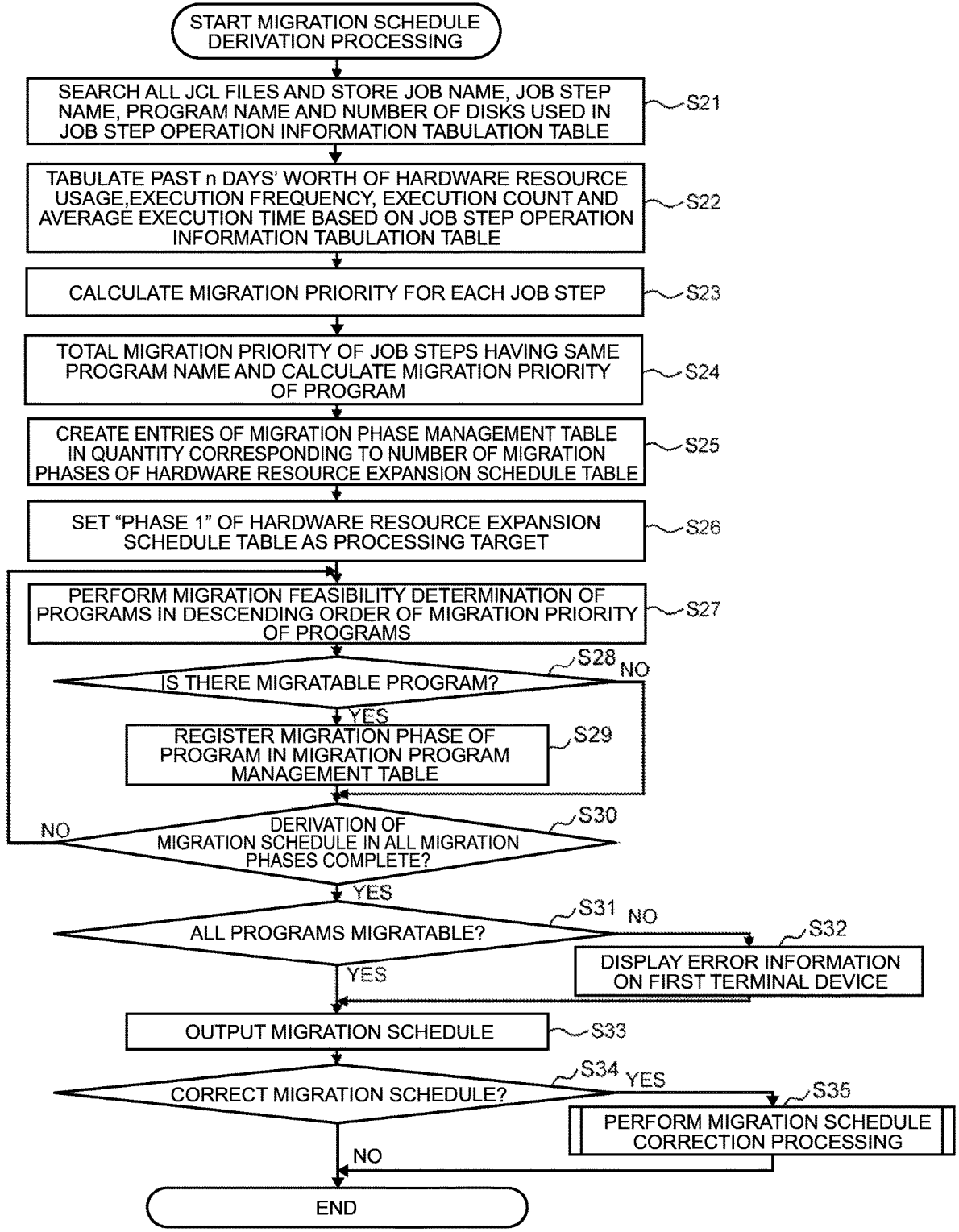
FIG. 12 is a diagram showing an example of the processing routine of the migration schedule derivation processing according to the first embodiment.

FIG. 12 is a diagram showing an example of the processing routine of the migration schedule derivation processing.

Foremost, the job execution control unit 131 searches all JCL files 151A, extracts the information of job name, job step name, program name, and number of disks used, and stores the information in the corresponding item of the job step operation information tabulation table 153 (step S21).

Next, the job execution control unit 131 tabulates past n days' worth of hardware resource usage (average CPU operating time, average memory usage, average disk usage), execution frequency, execution count, and average execution time based on the job step operation information table 152 (step S22). Note that the job execution control unit 131 stores the tabulated result in the corresponding item of the job step operation information tabulation table 153.

Next, the job execution control unit 131 calculates the migration priority for each job step (step S23). Note that the job execution control unit 131 stores the calculated result in the job step-based migration priority of the job step operation information tabulation table 153.

For example, the job execution control unit 131 calculates the migration priority for each job step by using (Math 1) below.

Migration priority job step=(CPU operating time priority relative ratio×CPU operating time calculation standard coefficient×average CPU operating time+memory usage priority relative ratio×memory usage calculation standard coefficient×average memory usage+disk usage priority relative ratio×disk usage calculation standard coefficient×average disk usage)×execution frequency+number of disks used priority relative ratio×number of disks used calculation standard coefficient×number of disks used (Math 1)

Next, the job execution control unit 131 totals the migration priority of job steps of the same program name and calculates the migration priority of the program (step S24). Note that the job execution control unit 131 stores the calculated program migration priority in the program-based migration priority of the migration priority table 156. More specifically, as explained with reference to FIG. 2, because there are cases where a plurality of job steps are associated with a program, the migration priority of job steps of the same program name is totaled in order to calculate the migration priority of the program.

As described above, the job execution control unit 131 calculates the migration priority of each program based on information indicating the weighting relative to the usage of hardware resources (CPU operating time priority relative ratio×CPU operating time calculation standard coefficient and the like), and operation information (average CPU operating time and the like) of hardware resources in the first computer 100 when each program is executed.

Next, the job execution control unit 131 creates entries of the migration phase management table 158 in a quantity corresponding to the number of migration phases of the hardware resource expansion schedule table 159 (step S25).

Next, the job execution control unit 131 sets the first (top) migration phase of "phase 1" of the hardware resource expansion schedule table 159 as the processing target upon starting the derivation of the migration schedule (step S26).

Next, the job execution control unit 131 performs migration feasibility determination of programs in descending order of migration priority of programs stored in the migration priority table 156 (step S27). For example, the job execution control unit 131 performs migration feasibility determination of each program by using (Math 2) below in descending order of the migration priority of programs.

(Total CPU operating time before migration of program to be subject to migration feasibility determation+total CPU operating time total before migration of program anticipated as having been migrated)×(post-migration CPU performance×CPU core count/pre-migration CPU performance×CPU core count)+total CPU operating time before migration of unmigrated program<batch processing time+batch processing permissible extension time (Math 2)

Here, the migration feasibility determination of programs is now explained by taking a case where, in the migration phase of "phase 1", it is determined that programs "AAA" and "BBB" with a high migration priority among all programs ("AAA" to "EEE") are already migratable, and program "CCC" with the next highest migration priority is subject to migration feasibility determination.

In the foregoing case, the estimation of the operating time of the CPU 220 in the second computer 200 is shown as (total operating time of CPU 120 by program "CCC" subject to migration feasibility determination+total operating time of CPU 120 by programs "AAA" and "BBB" anticipated as having been migrated)×(CPU performance of CPU 220× core count of CPU 220/CPU performance of CPU 120×core count of CPU 120). Moreover, the estimation of the operating time of the CPU 120 in the first computer 100 is shown as the total operating time of the CPU 120 by programs "DDD" and "EEE" which have not yet been migrated.

In other words, in the migration feasibility determination of programs, whether or not a program can be migrated is determined based on the total value of the estimate of operating time of the CPU 220 in the second computer 200 and the estimate of the operating time of the CPU 220 in the first computer 100, and the batch processing permissible time (total value of batch processing time and batch processing permissible extension time).

Next, the job execution control unit 131 determines whether there is a migratable program in the migration phase to be processed (step S28). The job execution control unit 131 advances the processing to step S29 upon determining that there is a migratable program, and advances the processing to step S30 upon determining that there is no migratable program.

In step S29, the job execution control unit 131 sets the migration phase of the migratable program as the migration phase to be processed and stores (registers) the set migration phase in the migration program management table 157, and then advances the processing to step S30.

In step S30, the job execution control unit 131 determines whether the derivation of the migration schedule has been completed in all migration phases. The job execution control unit 131 advances the processing to step S31 upon determining that the derivation of the migration schedule has been completed in all migration phases, and sets the next migration phase as the processing target and advances the processing to step S27 upon determining that the derivation of the migration schedule has not been completed in all migration phases.

In step S31, the job execution control unit 131 determines whether all programs are migratable. The job execution control unit 131 advances the processing to step S33 upon determining that all programs are migratable, and advances the processing to step S32 upon determining that there is a program that is not migratable.

In step S32, the job execution control unit 131 sends an instruction to the first terminal device 160 to the effect of displaying error information, and then advances the processing to step S33. Note that the first terminal device 160 displays the error information.

In step S33, the job execution control unit 131 outputs the migration schedule (migration schedule information). For example, the job execution control unit 131 sends an instruction to the first terminal device 160 to the effect of displaying the migration schedule. The first terminal device 160 displays the migration schedule upon receiving the foregoing instruction. Note that FIG. 18 and FIG. 19 show an output example of the migration schedule.

Next, the job execution control unit 131 determines whether the migration schedule should be corrected (whether an instruction was received from the first terminal device 160 to the effect of correcting the migration schedule) (step S34). The job execution control unit 131 advances the processing to step S35 upon determining that the migration schedule should be corrected, and ends the migration schedule derivation processing upon determined that the migration schedule should not be corrected.

In step S35, the job execution control unit 131 performs the migration schedule correction processing, and then ends the migration schedule derivation processing. Note that, while details will be described later, in the migration schedule correction processing, whether all programs are migratable is determined based on the corrected contents (corrected migration schedule information, corrected hardware resource expansion schedule information, and the like), and the corrected migration schedule is output.

(A-3) Migration Schedule Correction Processing

Figure 13:
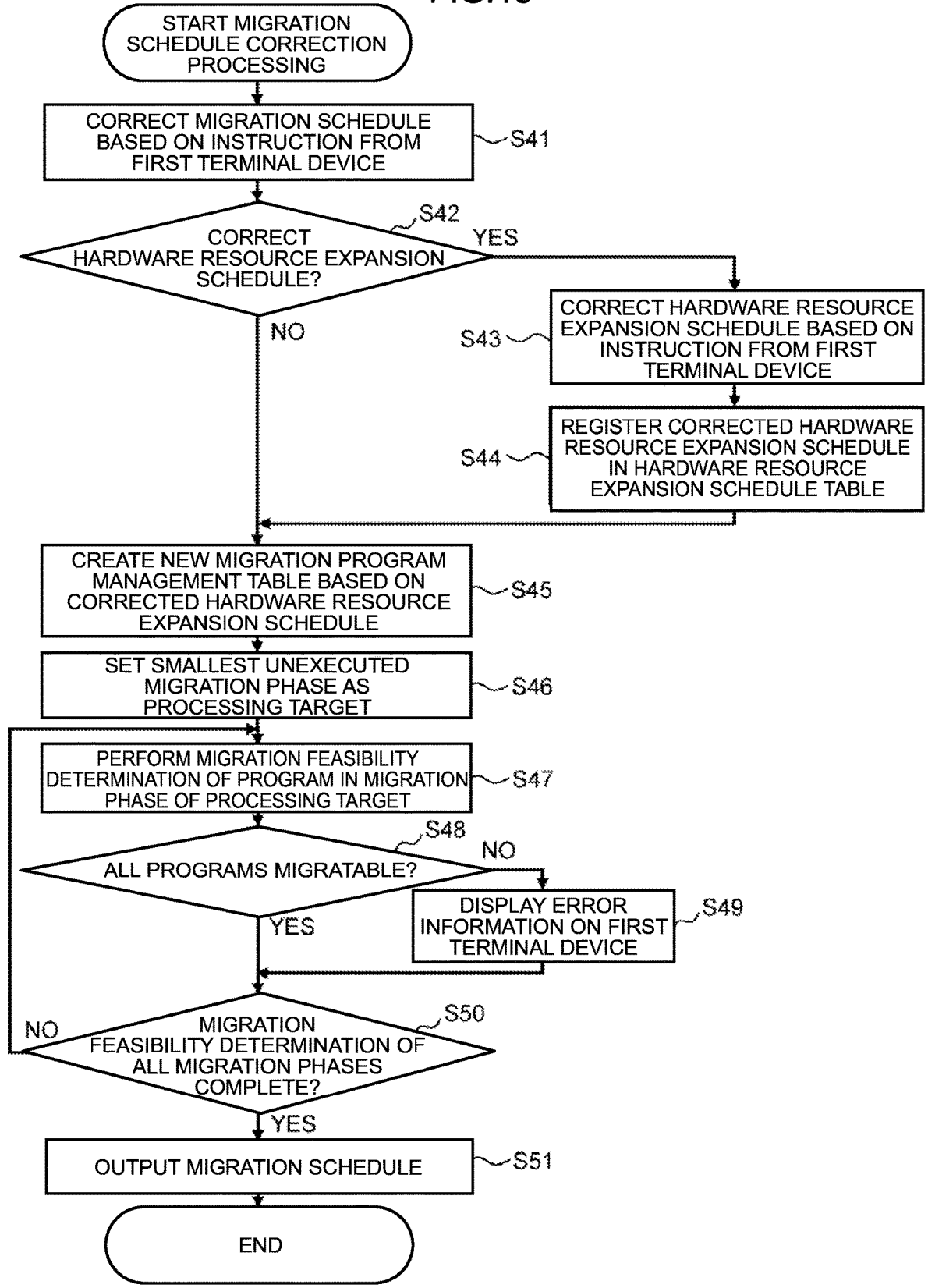
FIG. 13 is a diagram showing an example of the processing routine of the migration schedule correction processing according to the first embodiment.

FIG. 13 is a diagram showing an example of the processing routine of the migration schedule correction processing.

Foremost, the job execution control unit 131 corrects the migration schedule based on instructions from the first terminal device 160 (step S41).

Next, the job execution control unit 131 determines whether the hardware resource expansion schedule should be corrected (whether an instruction was received from the hardware resource expansion schedule to the effect of correcting the hardware resource expansion schedule) (step S42). The job execution control unit 131 advances the processing to step S43 upon determining that the hardware resource expansion schedule should be corrected, and advances the processing to step S45 upon determining that the hardware resource expansion schedule should not be corrected.

In step S43, the job execution control unit 131 corrects the hardware resource expansion schedule based on instructions from the first terminal device 160.

Next, the job execution control unit 131 stores (registers) the corrected hardware resource expansion schedule (corrected hardware resource expansion schedule information) in the hardware resource expansion schedule table 159 (step S44), and then advances the processing to step S45.

In step S45, the job execution control unit 131 creates a new migration program management table 157 based on the corrected migration schedule (corrected migration schedule information).

Next, the job execution control unit 131 sets the smallest (top) migration phase among unexecuted migration phases as the processing target (step S46).

Next, the job execution control unit 131 performs migration feasibility determination of all programs in the migration phase to be processed (step S47). Note that the job execution control unit 131 performs migration feasibility determination of programs by using (Math 2) above.

Next, the job execution control unit 131 determines whether all programs in the migration phase to be processed are migratable (step S48). The job execution control unit 131 advances the processing to step S50 upon determining that all programs are migratable, and advances the processing to step S49 upon determining that there is a program that is not migratable.

In step S49, the job execution control unit 131 sends an instruction to the first terminal device 160 to the effect of displaying error information, and then advances the processing to step S50. Note that the first terminal device 160 displays the error information.

In step S50, the job execution control unit 131 determines whether the migration feasibility determination has been completed in all migration phases. The job execution control unit 131 advances the processing to step S51 upon determining that the migration feasibility determination has been completed in all migration phases, and sets the next migration phase as the processing target and advances the processing to step S47 upon determining that the migration feasibility determination has not been completed in all migration phases.

In step S51, the job execution control unit 131 outputs the migration schedule, and then ends the migration schedule correction processing. For example, the job execution control unit 131 sends an instruction to the first terminal device 160 to the effect of displaying the migration schedule. The first terminal device 160 displays the migration schedule upon receiving the foregoing instruction. Note that FIG. 18 and FIG. 19 show an output example of the migration schedule.

(B) Migration Setting Processing Related to Setting of Migration of Programs in Batch Processing When migrating programs of the first computer 100 to the second computer 200, the user modifies the programs according to the migration schedule, and ports the programs to the second computer 200. When the modified programs are ported to the second computer 200, a port completion notice is sent from the second computer 200 to the first computer 100. The first computer 100 updates the ported flag corresponding to the relevant program in the migration program management table 157 to ON based on the foregoing notice. Subsequently, when the preparation for migrating the programs is complete, the user uses the first terminal device 160 to input a migration start command to start the migration of programs.

Figure 14:
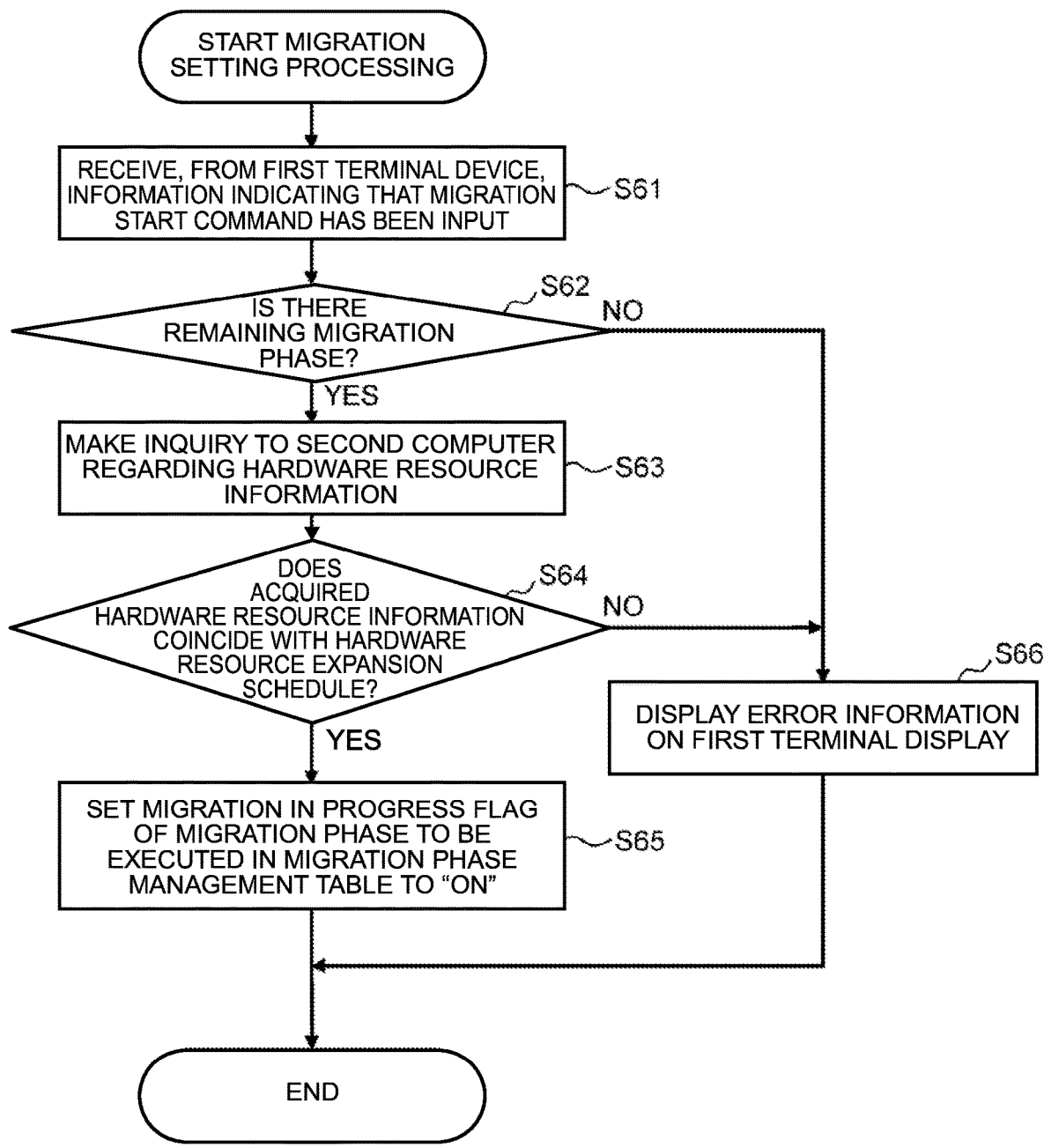
FIG. 14 is a diagram showing an example of the processing routine of the migration setting processing according to the first embodiment.

FIG. 14 is a diagram showing an example of the processing routine of the migration setting processing.

Foremost, the job execution control unit 131 receives information from the first terminal device 160 indicating that the migration start command has been input (step S61).

Next, the job execution control unit 131 determines whether there is any migration phase (remaining migration phase) in which migration is not yet complete (step S62). The job execution control unit 131 advances the processing to step S63 upon determining that there is a remaining migration phase, and advances the processing to step S66 upon determining that there is no remaining migration phase.

In step S63, the job execution control unit 131 makes an inquiry to the second computer 200 regarding the second hardware resource information, and acquires the second hardware resource information from the second computer 200. Note that the job execution control unit 231 of the second computer 200 acquires the second hardware resource information via the hardware resource management unit 232, and sends the acquired second hardware resource information to the first computer 100. More specifically, the second hardware resource information is information indicating the specification (for example, CPU performance, CPU core count, memory capacity, disk capacity) of hardware resources of the second computer 200.

Next, the job execution control unit 131 determines whether the acquired second hardware resource information coincides with the hardware resource expansion schedule information of the migration phase to be executed in the hardware resource expansion schedule table 159 (step S64). The job execution control unit 131 advances the processing to step S65 when they coincide, and advances the processing to step S66 when they do not coincide.

In step S65, the job execution control unit 131 turns ON the migration in progress flag of the migration phase to be executed in the migration phase management table 158, and then ends the migration setting processing.

In step S66, the job execution control unit 131 sends an instruction to the first terminal device 160 to the effect of displaying error information, and then ends the migration setting processing. Note that the first terminal device 160 displays the error information.

Figure 15:
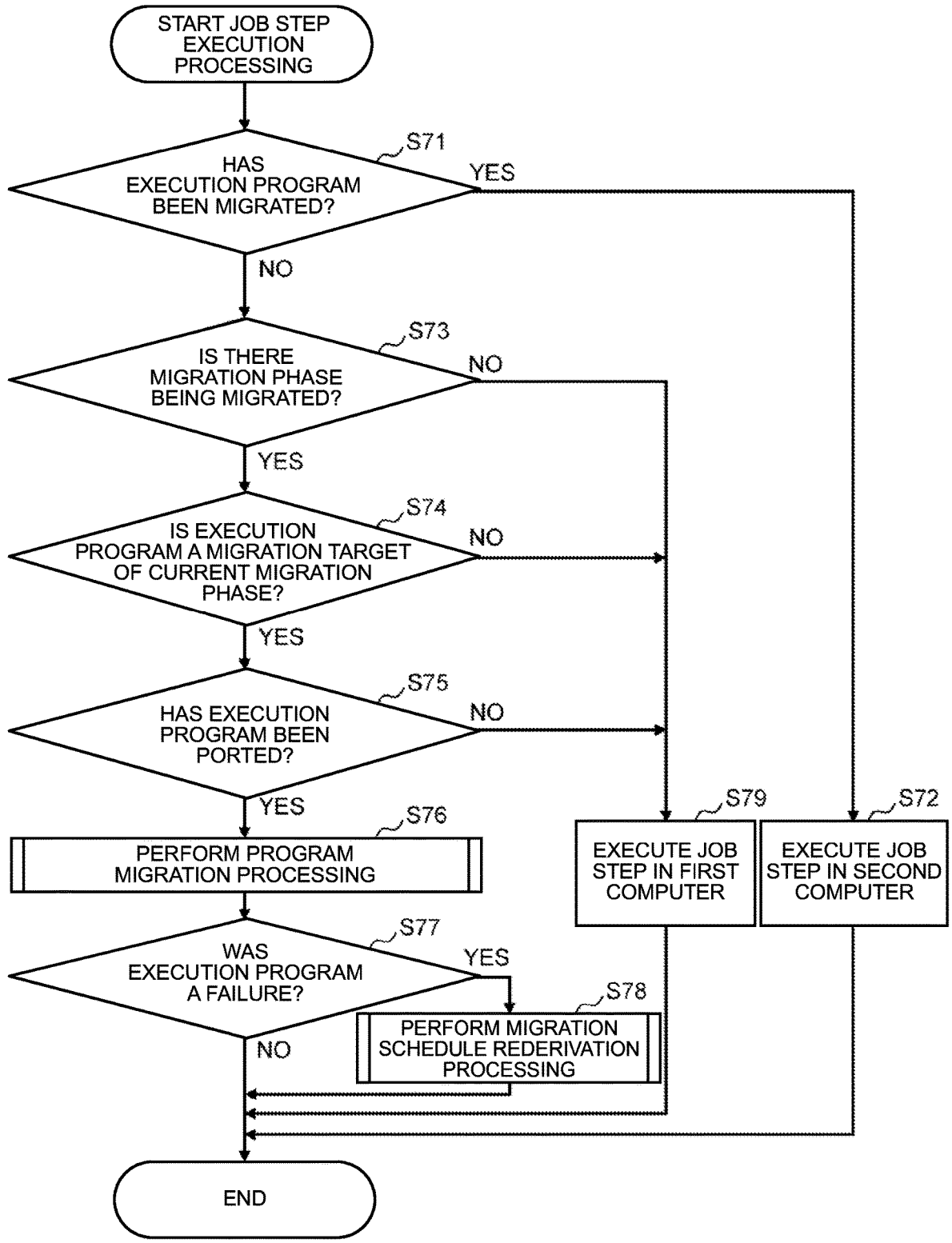
FIG. 15 is a diagram showing an example of the processing routine of the job step execution processing according to the first embodiment.

(C) Various Types of Processing Related to Migration of Programs in Batch Processing (C-1) Job Step Execution Processing FIG. 15 is a diagram showing an example of the processing routine of the job step execution processing. The job step execution processing is started when executing the job step of the job of batch processing.

Foremost, the job execution control unit 131 determines whether the migrated flag of the migration program management table 157 of the program to be executed (execution program) corresponding to the job step to be executed is ON (whether the execution program has been migrated) (step S71). The job execution control unit 131 advances the processing to step S72 upon determining that the execution program has been migrated, and advances the processing to step S73 upon determining that the execution program has not been migrated.

In step S72, the job execution control unit 131 sends an instruction to the second computer 200 to the effect of executing the job step (migrated program of the program corresponding to the job step), and then ends the job step execution processing. Note that the second computer 200 executes the job step (migrated program).

In step S73, the job execution control unit 131 determines whether there is a migration phase in the migration phase management table 158 in which the migration in progress flag is ON (whether there is a migration phase being migrated). The job execution control unit 131 advances the processing to step S74 upon determining that there is a migration phase being migrated, and advances the processing to step S79 upon determining that there is no migration phase being migrated.

In step S74, the job execution control unit 131 determines whether the execution program is a migration target of the current migration phase based on the migration program management table 157. The job execution control unit 131 advances the processing to step S75 upon determining that the execution program is a migration target, and advances the processing to step S79 upon determining that the execution program is not a migration target.

In step S75, the job execution control unit 131 determines whether the ported flag of the execution program in the migration program management table 157 is ON (whether the execution program has been ported). The job execution control unit 131 advances the processing to step S76 upon determining that the execution program has been ported, and advances the processing to step S79 upon determining that the execution program has not been ported.

In step S76, the job execution control unit 131 performs the program migration processing. Note that, while details will be described later, in the program migration processing, the execution program is migrated based on the execution result and the execution time in the first computer 100 and the second computer 200.

Next, the job execution control unit 131 determines whether the migration failure code of the execution program in the migration program management table 157 is "0" (whether a failure occurred in the migration of the execution program) (step S77). The job execution control unit 131 advances the processing to step S78 upon determining that a failure occurred in the migration of the execution program, and ends the job step execution processing upon determining that a failure has not occurred in the migration of the execution program (migration of the execution program was successful).

In step S78, the job execution control unit 131 performs the migration schedule rederivation processing, and then ends the job step execution processing. Note that, while details will be described later, in the migration schedule rederivation processing, the migration schedule is rederived.

In step S79, the job execution control unit 131 executes the job step (program corresponding to the job step) in the first computer 100, and then ends the job step execution processing.

(C-2) Program Migration Processing

Figure 16:
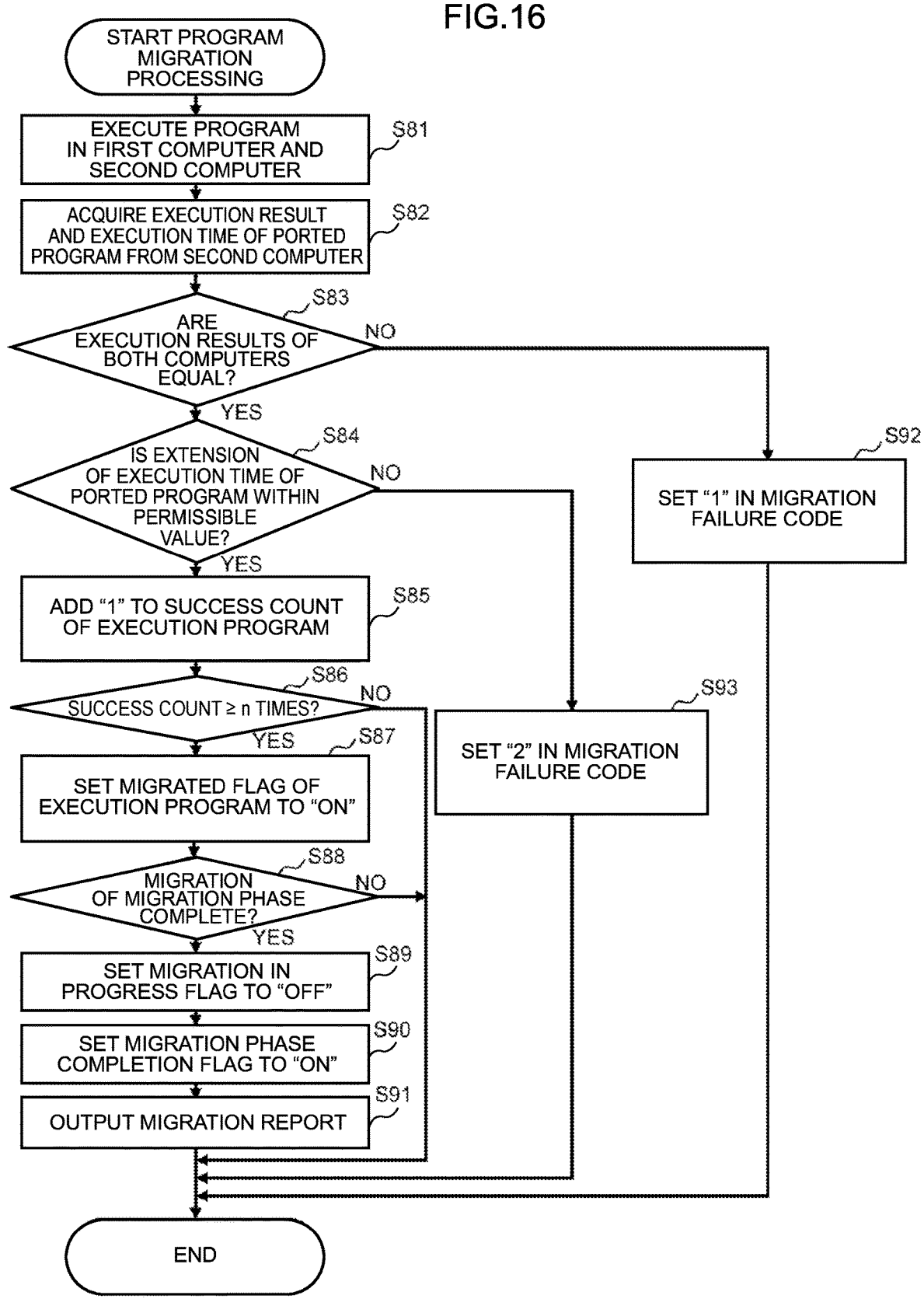
FIG. 16 is a diagram showing an example of the processing routine of the program migration processing according to the first embodiment.

FIG. 16 is a diagram showing an example of the processing routine of the program migration processing.

Foremost, the job execution control unit 131 executes the execution program in the first computer 100, and sends an instruction to the second computer 200 to execute the program (ported program) which was modified and ported so that the execution program is operable in the second computer 200 (step S81). In other words, programs (execution program and ported program) having the same processing contents are executed in both the first computer 100 and the second computer 200.

Next, the job execution control unit 131 acquires the execution result and the execution time of the ported program from the job execution control unit 231 of the second computer 200 (step S82).

Next, the job execution control unit 131 determines whether the execution result of the first computer 100 and the execution result of the second computer 200 are equal (step S83). The job execution control unit 131 advances the processing to step S84 upon determining that they are equal, and advances the processing to step S92 upon determining that they are not equal.

In step S84, the job execution control unit 131 determines whether the extension of the execution time of the ported program executed in the second computer 200 is within the batch processing permissible extension time. The job execution control unit 131 advances the processing to step S85 upon determining that the extension of the execution time of the ported program is within the batch processing permissible extension time, and advances the processing to step S93 upon determining that the extension of the execution time of the ported program is not within the batch processing permissible extension time.

In step S85, the job execution control unit 131 increments the success count corresponding to the execution program in the migration program management table 157 by "1".

Next, the job execution control unit 131 determines whether the success count is equal to or greater than a predetermined number of times (n times) (step S86). The job execution control unit 131 advances the processing to step S87 upon determining that the success count is equal to or greater than a predetermined number of times, and ends the program migration processing upon determining that the success count is not equal to or greater than a predetermined number of times.

In step S87, the job execution control unit 131 turns ON the migrated flag corresponding to the execution program in the migration program management table 157.

Next, the job execution control unit 131 determines whether the migration of the migration phase to which the execution program belongs has been completed (whether all migrated flags of the migration phase to which the execution program belongs in the migration program management table 157 have been turned ON) (step S88). The job execution control unit 131 advances the processing to step S89 upon determining that the migration has been completed, and ends the program migration processing upon determining that the migration has not been completed.

In step S89, the job execution control unit 131 turns OFF the migration in progress flag of the migration phase management table 158.

Next, the job execution control unit 131 turns ON the migration phase completion flag of the migration phase management table 158 (step S90).

Next, the job execution control unit 131 outputs a migration report (step S91), and then ends the program migration processing. For example, the job execution control unit 131 sends an instruction to the first terminal device 160 to the effect of displaying the migration report. The first terminal device 160 displays the migration report upon receiving the foregoing instruction. Note that FIG. 20 and FIG. 21 show an output example of the migration report.

In step S92, the job execution control unit 131 sets the migration failure code corresponding to the execution program in the migration program management table 157 to "1" (information indicating that the execution result is an error), and then ends the program migration processing.

In step S93, the job execution control unit 131 sets the migration failure code corresponding to the execution program in the migration program management table 157 to "2" (information indicating that an execution delay will occur), and then ends the program migration processing.

(C-3) Migration Schedule Rederivation Processing

Figure 17:
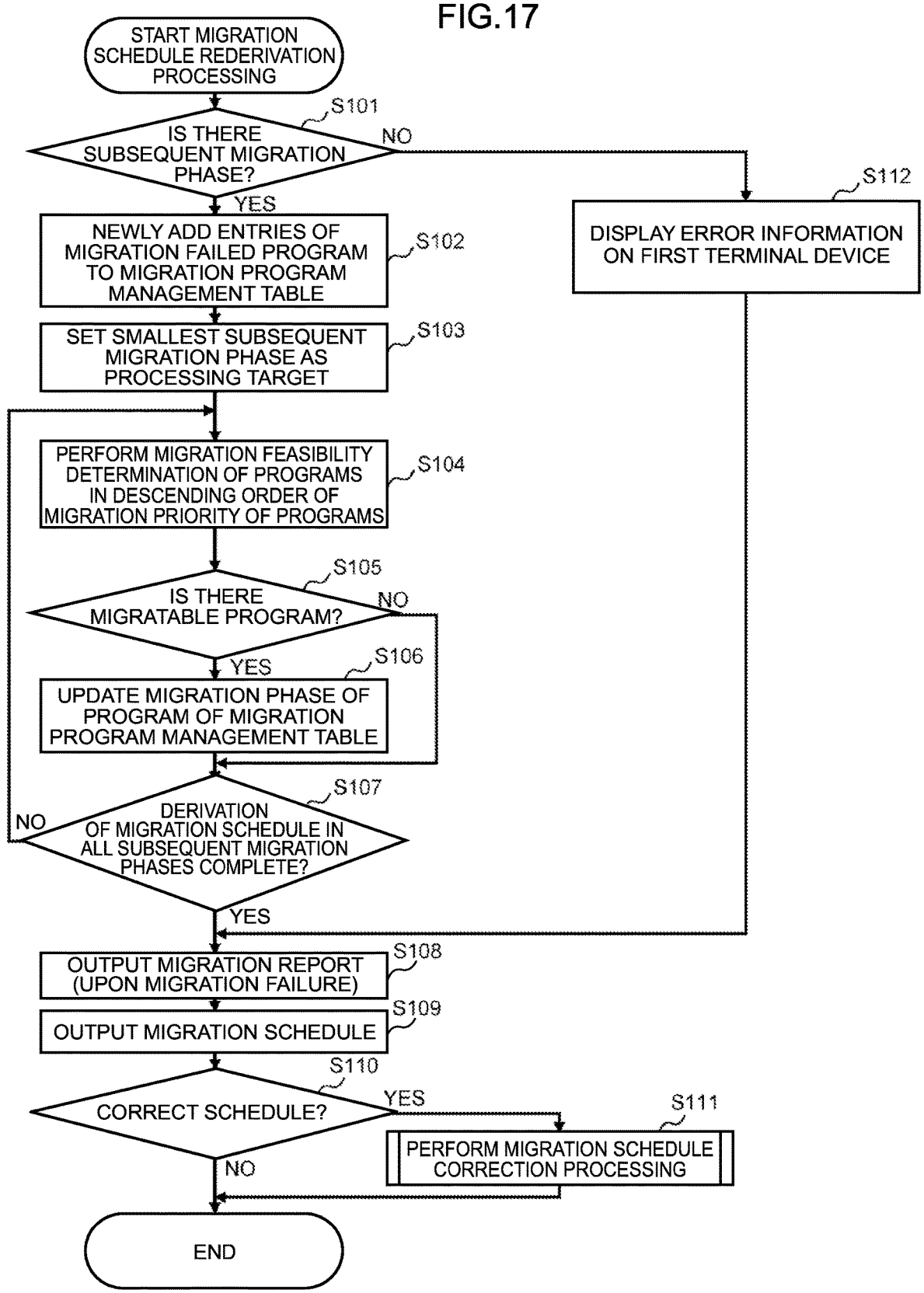
FIG. 17 is a diagram showing an example of the processing routine of the migration schedule rederivation processing according to the first embodiment.

FIG. 17 is a diagram showing an example of the processing routine of the migration schedule rederivation processing.

Foremost, the job execution control unit 131 determines whether there is a migration phase (subsequent migration phase) that is subsequent to the migration phase being migrated (step S101). The job execution control unit 131 advances the processing to step S102 upon determining that there is a subsequent migration phase, and advances the processing to step S112 upon determining that there is no subsequent migration phase.

In step S102, the job execution control unit 131 newly adds an entry of the program in which the migration was a failure (migration failed program) in the migration program management table 157.

Next, the job execution control unit 131 sets the smallest (top) migration phase among the subsequent migration phases as the processing target (step S103).

Next, the job execution control unit 131 performs migration feasibility determination of processing target programs (migration failed program and migration target program in the subsequent migration phase) in descending order of migration priority of the programs stored in the migration priority table 156 (step S104).

Next, the job execution control unit 131 determines whether there is a migratable program (step S105). The job execution control unit 131 advances the processing to step S106 upon determining that there is a migratable program, and advances the processing to step S107 upon determining that there is no migratable program.

In step S106, the job execution control unit 131 updates the migration phase corresponding to the migratable program of the migration program management table 157, and then advances the processing to step S107.

In step S107, the job execution control unit 131 determines whether the derivation of the migration schedule has been completed in all subsequent migration phases. The job execution control unit 131 advances the processing to step S108 upon determining that the derivation of the migration schedule has been completed in all subsequent migration phases, and sets the next migration phase as the processing target and then advances the processing to step S108 upon determining that the derivation of the migration schedule has not been completed in all subsequent migration phases.

In step S108, the job execution control unit 131 outputs a migration report upon a migration failure. For example, the job execution control unit 131 sends an instruction to the first terminal device 160 to the effect of displaying the migration report. The first terminal device 160 displays the migration report upon receiving the foregoing instruction. Note that FIG. 22 and FIG. 23 show an output example of the migration report.

Next, the job execution control unit 131 outputs a migration schedule (step S109). For example, the job execution control unit 131 sends an instruction to the first terminal device 160 to the effect of displaying the migration schedule.

The first terminal device 160 displays the migration schedule upon receiving the foregoing instruction. Note that FIG. 18 and FIG. 19 show an output example of the migration schedule.

Next, the job execution control unit 131 determines whether the migration schedule should be corrected (whether an instruction was received from the first terminal device 160 to the effect of correcting the migration schedule) (step S110). The job execution control unit 131 advances the processing to step S111 upon determining that the migration schedule should be corrected, and ends the migration schedule derivation processing upon determined that the migration schedule should not be corrected.

In step S111, the job execution control unit 131 performs the migration schedule correction processing, and then ends the migration schedule rederivation processing.

In step S112, the job execution control unit 131 sends an instruction to the first terminal device 160 to the effect of displaying error information, and then advances the processing to step S108. Note that the first terminal device 160 displays the error information.

(4) Migration Schedule

The migration schedule associates and stores information regarding the migration phase (information capable of identifying the migration phase, second hardware resource information used in the corresponding migration phase, and the like), information indicating the program to be migrated in the corresponding migration phase, and information indicating the migration priority of the corresponding program.

FIG. 18 is a diagram showing an example of the output of the migration schedule (migration schedule output example 301) which is output when it is determined that all programs are migratable.

The migration schedule output example 301 shows that all programs ("AAA" to "EEE") are migratable. Moreover, the migration schedule output example 301 also shows that, with the hardware resources used in the migration phase of "phase 1", while program "CCC" cannot be migrated subsequent to programs "AAA" and "BBB", programs "DDD" and "EEE" can be migrated. This example also shows that, in the migration phase of "phase 2" in which the core count of the CPU 220 is expanded, program "CCC" can be migrated.

FIG. 19 is a diagram showing an example of the output of the migration schedule (migration schedule output example 302) which is output when it is determined that there is a program that cannot be migrated.

The migration schedule output example 302 shows that program "FFF" cannot be migrated with the current hardware resource expansion schedule.

The user, for example, by confirming the migration schedule, can understand whether all programs are migratable, and which program can be migrated in which migration phase. Moreover, for example, because the hardware resources of each migration phase and the migration priority of programs are displayed, the user can easily review the hardware resource expansion schedule and the migration order of programs.

(5) Migration Report

The migration report associates and stores information regarding the migration phase (information capable of identifying the migration phase, second hardware resource information used in the corresponding migration phase, and the like), information indicating the program to be migrated in the corresponding migration phase, information indicating the migration priority of the corresponding program, information indicating the number of times that the execution of the corresponding program succeeded consecutively, and information indicating whether the migration of the corresponding program was successful.

FIG. 20 is a diagram showing an example of the output of the migration report (migration report output example 303) which is output when the migration of all programs of one migration phase is complete.

The migration report output example 303 shows that the migration of all programs ("AAA", "BBB", "DDD", and "EEE") scheduled to be migrated in the migration phase of "phase 1" was successful, and the migration of the migration phase of "phase 1" has been completed. This example also shows that, with regard to all programs ("CCC") scheduled to be migrated in the migration phase of "phase 2", the migration in the migration phase of "phase 2" has not yet been completed.

FIG. 21 is a diagram showing an example of the output of the migration report (migration report output example 304) which is output when the migration of all migration phases is complete.

The migration report output example 304 shows that the migration of all programs ("AAA", "BBB", "DDD", and "EEE") scheduled to be migrated in the migration phase of "phase 1" was successful, the migration in the migration phase of "phase 1" has been completed, the migration of all programs ("CCC") scheduled to be migrated in the migration phase of "phase 2" was successful, and the migration in the migration phase of "phase 2" has been completed.

FIG. 22 is a diagram showing an example of the output of the migration report (migration report output example 305) which is output when there is an error in the execution result of the program of a certain migration phase. Note that, with the computer system 1, when the migration of a program is unsuccessful, the migration schedule in which the corresponding program is to be migrated in the subsequent migration phase is rederived.

The migration report output example 305 shows that, in the migration of program "EEE" scheduled to be migrated in the migration phase of "phase 1", the execution result of the ported program of program "EEE" is an error, and the migration of program "EEE" was unsuccessful.

With the computer system 1, when the migration of program "EEE" is unsuccessful, because a migration report including the cause of failure (in this example, information "failure (result error)" indicating that the execution result is an error) is output, for example, the user can remodify the ported program of program "EEE", input a migration start command, and resume the migration of the program based on the rederived migration schedule.

FIG. 23 is a diagram showing an example of the output of the migration report (migration report output example 306) which is output when there is a delay in the execution result of the program of a certain migration phase.

The migration report output example 306 shows that, in the migration of program "EEE" scheduled to be migrated in the migration phase of "phase 1", there is an execution delay in the ported program of program "EEE", and the migration of program "EEE" was unsuccessful.

With the computer system 1, when the migration of program "EEE" is unsuccessful, because a migration report including the cause of failure (in this example, information "failure (execution delay)" indicating that the execution result is an error) is output, for example, the user can correct the migration schedule or change the hardware resource expansion schedule, input a migration start command, and resume the migration of the program based on the rederived migration schedule.

(6) Characteristic Configuration of Computer System

The computer system 1 calculates the migration priority of each program based on weighting relative to the usage of hardware resources (for example, CPU usage, memory usage, disk usage), and the operation information in the first computer 100 (for example, mainframe system), determines the migration feasibility of programs from the top migration phase based on the hardware resource expansion schedule (hardware resource information of the second computer 200 (for example, open system) for each migration phase) in order of migration priority, and thereby creates the migration schedule (migration order of programs).

According to the computer system 1, because a migration schedule for migrating migratable programs to the second computer 200 from those with high usage of hardware resources in the first computer 100 is provided, it is possible to reduce the hardware resources of the first computer 100 from the initial stage of migration, and thereby suppress running costs.

Moreover, according to the computer system 1, because the migration feasibility of programs is determined by giving consideration to the hardware resource information of the second computer 200, it is possible to prevent the overrun of processing.

Here, depending on the hardware resource expansion schedule, there is a problem in that the migration of programs with high usage may be postponed.

Regarding this point, with the computer system 1, because a migration schedule (migration order and migration priority) is output, the user can correct the migration schedule or change the hardware resource expansion schedule so that the migration of programs with high usage is not postponed.

Moreover, when the migration feasibility of programs is determined, there is a problem in that the migration may take more time than the estimated time, and may not be completed.

Regarding this point, with the computer system 1, the current hardware resource information of the second computer 200 is acquired, and processing for migrating the corresponding program (turning ON the migrated flag of the corresponding program and the like) is performed when the acquired hardware resource information coincides with the hardware resource expansion schedule information, the program has been migrated to the second computer 200, the ported program of the corresponding program is executed, and the execution is successful (completed with delay). Because the migration of the program is performed based on the actual execution time as described above, it is possible to prevent the overrun of processing by the second computer 200 after the migration of the program.

According to this embodiment, it is possible to properly migrate programs between different computers.

(7) Other Embodiments

Note that, while the foregoing embodiment explained a case of applying the present invention to the computer system 1, the present invention is not limited thereto, and the present invention may be applied broadly to various types of computer systems.

Moreover, in the embodiment described above, while the four examples of CPU operating time priority relative ratio, memory usage priority relative ratio, disk usage priority relative ratio, and number of disks used priority relative ratio were explained as the weighting of migration priority, the present invention is not limited thereto, and, among the four relative ratios described above, three arbitrary relative ratios may be adopted, two arbitrary relative ratios may be adopted, or one arbitrary usage may be adopted.

Moreover, in the embodiment described above, while the batch processing permissible extension time was explained as an example of the permissible value of extension, the present invention is not limited thereto, and any unit of job step, job, or batch processing may also be adopted. Moreover, a different value may also be set for teach migration phase of the hardware expansion schedule.

Moreover, in the embodiment described above, while a case where the job execution control unit 131 (first computer 100) executes the processing (steps) shown in FIG. 11 to FIG. 17 was explained, the present invention is not limited thereto, and one or more other computers may also execute a part of the processing shown in FIG. 11 to FIG. 17. In the foregoing case, let it be assumed that the information required for the processing has been acquired by another computer at an appropriate timing.

Moreover, in the embodiment described above, while a case of performing various inputs via the first terminal device 160 was explained, the present invention is not limited thereto, and the first computer 100 may also be configured to read text data containing the input contents.

Moreover, in the embodiment described above, while a case of ending the migration schedule derivation processing when the processing of step S35 is completed was explained, the present invention is not limited thereto, and the configuration may also be such that the processing returns to step S34 when the processing of step S35 is completed.

Moreover, in the embodiment described above, while a case of ending the migration schedule rederivation processing when the processing of step S111 is completed was explained, the present invention is not limited thereto, and the configuration may also be such that the processing returns to step S110 when the processing of step S111 is completed.

Moreover, in the embodiment described above, while a case of storing various types of data (table, file, and the like) in the auxiliary storage device 150 was explained, the present invention is not limited thereto, and various types of data may also be stored in a storage apparatus capable of communicating with the first computer 100. In the foregoing case, the storage apparatus is configured, for example, from a disk array device equipped with a plurality of storage devices, such as hard disk devices, and retains data required for the various batch operations to be executed by the first computer 100. The storage apparatus stores data in the storage devices according to a write request from the first computer 100, and reads the requested data from the storage devices and sends the requested data to the first computer 100 according to a read request from the first computer 100.

The contents described above may be suitably combined, omitted, modified, or rearranged to the extent that it will not exceed the subject matter of the present invention.

REFERENCE SIGNS LIST

1 . . . computer system, 100 . . . first computer, 110 . . . internal bus, 120 . . . CPU, 130 . . . primary storage device, 140 . . . communication device, 150 . . . auxiliary storage device, 160 . . . first terminal device, 200 . . . second computer, 210 . . . internal bus, 220 . . . CPU, 230 . . . primary storage device, 240 . . . communication device, 250 . . . auxiliary storage device, 260 . . . second terminal device.

The invention claimed is:

1. A computer system comprising a first computer as a migration source of a plurality of programs, and a second computer as a migration destination of the plurality of programs and which is different from the first computer, wherein the first computer:
   calculates a migration priority of each of the plurality of programs based on information which indicates weighting relative to usage of hardware resources, and operation information of hardware resources in the first computer when each of the plurality of programs is executed; and
   based on hardware resource expansion schedule information which defines hardware resources of the second computer in each of a plurality of migration phases, determines migration feasibility of a program in hardware resources used in each migration phase and decides the migration phase for migrating each of the plurality of programs in order from a first migration phase of the plurality of migration phases and in order of the calculated migration priority;
   wherein when the first computer determines that the program, which has been modified so that the program to be executed is operable in the second computer, has been ported to the second computer and that the second computer has completed execution of the ported program without delay, the first computer performs processing for migrating the program to be executed.

2. The computer system according to claim 1,
wherein, when the first computer determines that a result of executing the program to be executed coincides with a result of the second computer executing the ported program, the first computer performs processing for migrating the program to be executed.

3. The computer system according to claim 1,
wherein a program, which has been modified so that a program to be executed is operable in the second computer, has been ported to the second computer, and
wherein, when the first computer determines that a result of executing the program to be executed does not coincide with a result of the second computer executing the ported program, or when the second computer completes execution of the ported program with delay, the first computer targets unmigrated programs consisting of the program to be executed and programs to be migrated in a migration phase which is subsequent to a migration phase in which the program to be executed is to be migrated, and determines migration feasibility of a program in hardware resources used in each migration phase and determines the migration phase for migrating the unmigrated programs in order from a first migration phase of the subsequent migration phase and in order of the calculated migration priority.

4. The computer system according to claim 1,
wherein the first computer outputs migration schedule information which indicates a migration phase of migrating each of the plurality of programs.

5. The computer system according to claim 4,
wherein the first computer is able to receive corrected migration schedule information, which is information after correcting the migration schedule information, and determines migration feasibility of a program in hardware resources used in each migration phase based on the corrected migration schedule information.

6. The computer system according to claim 5,
wherein the first computer is able to receive corrected hardware resource expansion schedule information, which is information after correcting the hardware resource expansion schedule information, and determines migration feasibility of a program in hardware resources used in each migration phase based on the corrected migration schedule information and the corrected hardware resource expansion schedule information.

7. A program migration method in a computer system comprising a first computer as a migration source of a plurality of programs, and a second computer as a migration destination of the plurality of programs and which is different from the first computer,
wherein the program migration method comprises:
   a first step of a computer calculating a migration priority of each of the plurality of programs based on information which indicates weighting relative to usage of hardware resources, and operation information of hardware resources in the first computer when each of the plurality of programs is executed; and
   a second step of a computer, based on hardware resource expansion schedule information which defines hardware resources of the second computer in each of a plurality of migration phases, determining migration feasibility of a program in hardware resources used in each migration phase and deciding the migration phase for migrating each of the plurality of programs in order from a first migration phase of the plurality of migration phases and in order of the calculated migration priority,
wherein when the first computer determines that the program, which has been modified so that the program to be executed is operable in the second computer, has been ported to the second computer and that the second computer has completed execution of the ported program without delay, the first computer performs processing for migrating the program to be executed.

* * * * *